US009043244B2

(12) United States Patent
Im et al.

(10) Patent No.: US 9,043,244 B2
(45) Date of Patent: May 26, 2015

(54) LICENSE CONSIGNMENT METHOD AND SYSTEM FOR PORTABLE DEVICE

(75) Inventors: Kwan Hyuk Im, Gumi-si (KR); Kyung Keun Lee, Daegu (KR); Byung Rae Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1025 days.

(21) Appl. No.: 12/372,474

(22) Filed: Feb. 17, 2009

(65) Prior Publication Data

US 2009/0210947 A1    Aug. 20, 2009

(30) Foreign Application Priority Data

Feb. 19, 2008   (KR) ........................ 10-2008-0014967

(51) Int. Cl.
| | |
|---|---|
| G06F 21/00 | (2013.01) |
| H04N 21/266 | (2011.01) |
| G06F 21/10 | (2013.01) |
| H04N 7/16 | (2011.01) |
| H04N 21/254 | (2011.01) |
| H04N 21/6334 | (2011.01) |

(52) U.S. Cl.
CPC .......... *H04N 21/26613* (2013.01); *G06F 21/10* (2013.01); *G06F 2221/0786* (2013.01); *H04N 7/165* (2013.01); *H04N 21/2541* (2013.01); *H04N 21/63345* (2013.01)

(58) Field of Classification Search
USPC ............ 705/16, 21, 59, 71; 380/44, 262, 278, 380/279
See application file for complete search history.

(56) References Cited

U.S. PATENT DOCUMENTS

| | | | |
|---|---|---|---|
| 7,603,318 | B1 * | 10/2009 | Colosso et al. ................. 705/59 |
| 2004/0032400 | A1 * | 2/2004 | Freeman et al. ............. 345/173 |
| 2005/0144253 | A1 * | 6/2005 | Yoshino et al. .............. 709/217 |
| 2005/0239454 | A1 | 10/2005 | Kawashima et al. |
| 2006/0026105 | A1 * | 2/2006 | Endoh ............................. 705/59 |
| 2006/0143134 | A1 * | 6/2006 | So et al. .......................... 705/59 |
| 2006/0212405 | A1 | 9/2006 | Gordon et al. |
| 2007/0150967 | A1 * | 6/2007 | Takahashi ....................... 726/31 |
| 2007/0289025 | A1 * | 12/2007 | Tanaka et al. ................... 726/28 |
| 2008/0040259 | A1 * | 2/2008 | Snow et al. ..................... 705/38 |
| 2008/0154676 | A1 * | 6/2008 | Suk .................................. 705/7 |
| 2008/0165967 | A1 | 7/2008 | Ross et al. |
| 2009/0083780 | A1 * | 3/2009 | Beyabani ....................... 725/14 |
| 2009/0083789 | A1 * | 3/2009 | Quinney et al. ................ 725/38 |

FOREIGN PATENT DOCUMENTS

WO    2006/059178 A1    6/2006

* cited by examiner

*Primary Examiner* — Dante Ravetti
(74) *Attorney, Agent, or Firm* — Jefferson IP Law, LLP

(57) ABSTRACT

A license consignment method and system for a portable device playing a right-protected content with a license is provided for improving utilization reliability and manageability of a license by enabling a license server to manage the license consigned by the portable device. The method includes selecting a license to be consigned to a license server, transmitting the license server license information corresponding to the selected license, and transmitting, when the license is not downloaded in a certain time, a download trigger message to the portable device.

14 Claims, 7 Drawing Sheets

FIG . 3

```
<element name="roUploadRequest" type="roap:ROUploadRequest"/>
<complexType name="ROUploadRequest">
 <annotation>
  <documentation xml:lang="en">
   Message sent from Device to RI to upload ROs.
  </documentation>
 </annotation>
 <complexContent>
  <extension base="roap:Request">
   <sequence>
    <element name="deviceID" type="roap:Identifier"/>
    <element name="riID" type="roap:Identifier"/>
    <element name="nonce" type="roap:Nonce"/>
    <element name="time" type="dateTime"/>
    <element name="UploadRO">
     <complexType>
     <sequence maxOccurs="unbounded">
      <element name="roID" type="ID"/>
      <element name="stateInfo" type="o-ex:constraintType
        " minOccurs="0" maxOccurs="unbounded"/>
     </ sequence >
     </complexType>
    </element>
    <element name="certificateChain" type=
      "roap:CertificateChain" minOccurs="0"/>
    <element name="extensions" type="roap:Extensions" minOccurs="0"/>
    <element name="signature" type="base64Binary"/>
   </sequence>
  </extension>
 </complexContent>
</complexType>
```

FIG. 5

```
<element name="roUploadResponse" type="roap:ROUploadResponse"/>
<complexType name="ROUploadResponse">
<annotation>
<documentation xml:lang="en">
Message sent from RI to Device in response to a ROUploadRequest.
</documentation>
</annotation>
<complexContent>
<extension base="roap:Response">
<sequence minOccurs="0">
<element name="deviceID" type="roap:Identifier"/>
<element name="riID" type="roap:Identifier"/>
<element name="nonce" type="roap:Nonce"/>
<element name="certificateChain" type="roap:CertificateChain"
  minOccurs="0"/>
<element name="ocspResponse" type="base64Binary" minOccurs="0"
  maxOccurs="unbounded"/>
<element name="extensions" type="roap:Extensions" minOccurs="0"/>
 <element name="signature" type="base64Binary"/>
 </sequence>
 </extension>
 </complexContent>
 </complexType>
```

LICENSE CONSIGNMENT METHOD AND SYSTEM FOR PORTABLE DEVICE

PRIORITY

This application claims the benefit under 35 U.S.C. §119 (a) of a Korean patent application filed on Feb. 19, 2008 in the Korean Intellectual Property Office and assigned Serial No. 10-2008-0014967, the entire disclosure of which is hereby incorporated by reference.

BACKGROUND OF THE INVENTION

1. Field of the Invention

The present invention relates to the management of right-protected content. More particularly, the present invention relates to a license consignment method and system for a portable device that is capable of improving utilization reliability and manageability of a license.

2. Description of the Related Art

Digital Rights Management (DRM) is an access control technology that is used to protect the intellectual property of distributed digital media by limiting its use through encryption techniques. That is, DRM technology securely transmits contents from a Content Provider (CP) to a user and protects the contents from being illegally used and distributed. DRM technologies attempt to prevent the digital contents through all the phases of creation, distribution, use and abrogation, and restrict access and usage rights of a user on the digital contents in online and even offline states.

In order for a portable device to consume a DRM-protected content (or DRM content), the portable device downloads the DRM content from a content server and a license required for consuming the DRM content from a right issuer. After the DRM content and its license are completely downloaded, the portable device can consume the DRM content.

Typically, the license of the DRM content can be obtained by paying for downloading from the right issuer. Accordingly, the user pays for the license and downloads the license from the right issuer by means of a communication device, such as a personal computer or a portable device.

For various reasons, the license issued for a portable device is required to be consigned to another device. However, an effective license consignment technique has not yet been proposed.

Therefore, a need exists for a license consignment system and method for providing a portable device with efficient license consignment procedures for improving utilization of the license.

SUMMARY OF THE INVENTION

An aspect of the present invention is to address at least the above mentioned problems and/or disadvantages and to provide at least the advantages described below. Accordingly, an aspect of the present invention is to provide a license consignment method and system for right-protected content management for improving utilization of a license allowing a portable device to consume a right-protected content.

In accordance with an aspect of the present invention, a license consignment service method for a portable device including at least one license for permitting consumption of protected contents is provided. The method includes selecting a license to be consigned to a license server, transmitting the license server license information corresponding to the selected license, and transmitting, when the license is not downloaded in a certain time, a download trigger message from the license server to the portable device.

In accordance with another aspect of the present invention, a license consignment service method for a portable device including at least one license for consuming protected contents is provided. The method includes transmitting a license consignment request message including a field set with consignment conditions including a consignment period from the portable device to a license server, transmitting a response message from the license server to the portable device in response to the license consignment request message, transmitting a download trigger message from the license server to a designated device before the consignment period expires, and transmitting the download trigger message to the portable device, when the license server does not receive a reply from the designated device.

In accordance with still another aspect of the present invention, a license consignment system is provided. The license consignment system includes a portable device including at least one license for permitting consumption of protected contents and for transmitting license information for consignment of the license and a license server for preserving the license information transmitted by the portable device and for transmitting a designated device a download trigger message for soliciting the designated device to download the license.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 3 is a diagram illustrating a format of a license upload request message according to an exemplary embodiment of the present invention;

FIG. 5 is a diagram illustrating a format of a license upload response message according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
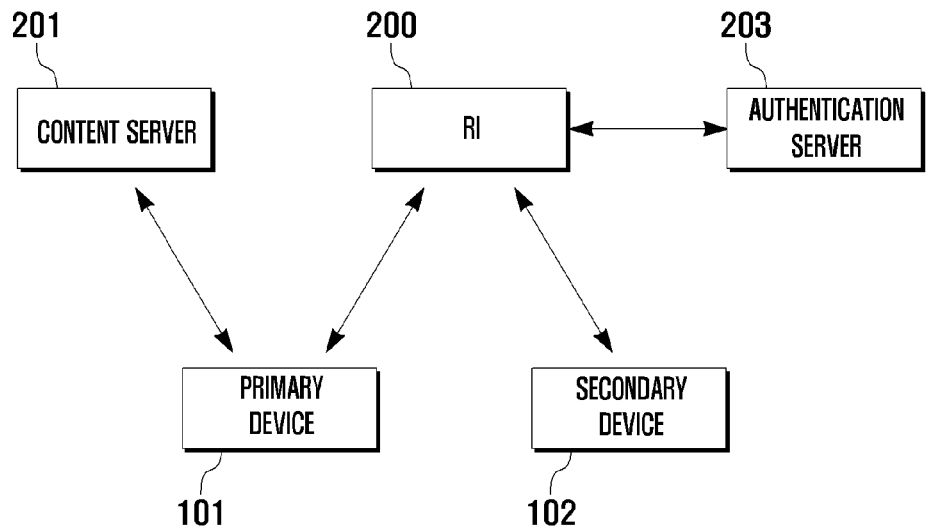
FIG. 1 is a diagram illustrating a license consignment system according to an exemplary embodiment of the present invention.

Although FIG. 1 is depicted with two devices (e.g., mobile and/or fixed terminals) that want to share a license, the license consignment system may be implemented and operate only with one device. For instance, a mobile device may consign a license to a Rights Issuer (RI) and download the license from the RI before the consignment expires. Also, the license consignment system may have two mobile devices, implemented in the same configuration, share the consigned license. In the following description, a license server may group more than one device into a domain such that the member devices of the domain may download the license consigned by a specific member device (hereinafter called primary device). When it is required that the primary device shares the license with another device (hereinafter called secondary device), the primary device registers the other device with the domain as a secondary device such that the secondary device may download the license from the RI. For this purpose, the primary device transmits information on the secondary device to the RI in the license consignment procedure. The primary device may consign the license in an upload scheme or a move scheme. The upload scheme allows the primary device to upload the information on the license to be consigned to the RI in order for the devices, which the user owns and/or allows downloading the license, to access the RI and download the license from the RI. The devices allowed for downloading the license comprise the primary device and the secondary device within the domain and other devices permitted by the primary device. In the meantime, the move scheme allows a device having an identity number (e.g., phone number) designated by the primary device to download the license from the RI.

In the following description, the portable device consigns license information corresponding to the license to the RI and the RI informs secondary devices of the license consignment before the expiration of the consignment with reference to the license information.

The license information upload and license download may be performed according to a well-known procedure specified in a standard, such as Open Mobile Alliance DRM (OMA DRM). Although the license consignment method is described in association with the OMA DRM standard, the present invention is not limited thereto. For example, the license information upload and license download procedure may be performed according to the procedures specified in other standards or their equivalent procedures.

The license may be consigned to the RI that has issued the license to the portable device or an agent server dedicated for the license consignment. In the following description, the license is consigned to an agent server. The agent server may support the functions of RI, whereby the term "agent server" is interchangeably user with the RI.

In the following description, it is assumed that the portable device creates license information including a license Identification (ID), a server ID, a consignment condition, device information, a consumption count and a consumption condition, associated with the license stored in the memory of the portable device, and consigns the license information to the RI. At this time, the license information may be sent with the license itself depending on the consignment policy. Here, it is assumed that only the license information is consigned to the RI.

FIG. 1 is a diagram illustrating a license consignment system according to an exemplary embodiment of the present invention.

Referring to FIG. 1, the license consignment system includes a primary device 101 that consigns license information of a specific license, an RI 200 that manages the license information consigned by the primary device 101 and a secondary device 102 that downloads the license corresponding to the consigned license information from the RI 200. The license consignment system further includes a content server that provides the devices 101 and 102 with the content to be consumed with the license and an authentication server 203 that authenticates the license and reference time associated with the license.

Here, the operation of the secondary device 102 may be performed by the primary device 101 or another device to which the primary device 101 wants to share the license.

The primary device 101 downloads DRM content from the content server 201 and downloads and stores a license associated with the DRM content, wherein the license specifies rights that define how the device is allowed to consume the DRM content. The primary device 101 consumes the DRM content as allowed by the license. In the meantime, the primary device 101 may consign the license to the RI 200. In an exemplary implementation, the consignment is associated with an expiration time before which the license can be downloaded and after which the consignment is withdrawn. The license information transmitted to the primary device 101 may contain a consignment condition. The consignment condition may be a notification setting such that the RI periodically notifies the primary device 101 or a secondary device (within a domain) of the consignment expiration time based on the notification setting in order for the primary device 101 or the secondary device to withdraw the consignment according to the upload scheme. Also, the consignment condition may comprise a notification setting such that the RI 200 notifies the secondary device 102 of the consignment expiration time before the consignment expiration. When the secondary device 102 does not download the corresponding license, the RI 200 notifies the primary device 101 of the consignment expiration according to the move scheme.

The primary device is configured to a time in various time formats associated with the license consignment. Accordingly the user may set the time in Greenwich Mean Time (GMT) format, in a period (e.g., 2 months, 12 days, and 20 hours) or in a second-converted time (e.g., 2073600 seconds corresponding to 24 days). In consideration of data compression efficiency, the device may convert the time input by the user into seconds and transmit the time in a binary format.

The consignment condition may include at least one of period information and notification information. The configuration of the consignment condition is described in detail with explanation of an internal structure of the device.

The RI 200 stores the license information consigned by the primary device 101, manages the license information during a consignment period indicated by the consignment condition and transmits a notification soliciting the primary device 101 and/or a designated device 102 to download the license corresponding to the license information. In more detail, when the consignment condition includes the period information, the RI 200 notifies a device designated by the user to download the consigned license before the consignment expiration. When the license is not downloaded by the designated device, the RI 200 notifies the primary device 101 to withdraw the consignment. Here, the notification may be performed using a trigger message, i.e., the Rights Object Acquisition trigger message specified in the OMA DRM standard. When the consignment condition includes the notification information, the RI 200 performs the consignment notification according to its policy or the consignment condition. That is, the RI 200 notifies the device designated by the primary device (secondary device 102) to download the license periodically after a consignment. The RI 200 may set the consignment period and notification cycle randomly when the consignment condition is set only with the notification information. In a case where the secondary device 102 does not reply to the download trigger message in a predetermined period or in a predetermined number of times, the RI 200 notifies the primary device 101 of the no reply. That is, the RI 200 determines the notification count and transmits the download trigger message at the notification count according to its policy. The RI 200 may provide the primary device 101 with the consignment period of the license in the consignment process or thereafter. The RI 200 may be configured to delete the license when the consignment period has expired. The operation of the RI 200 is described below in more detail.

As described above, in the license consignment system according to an exemplary embodiment of the present invention, the primary device 101 requests the RI 200 for the consignment of the license stored in the primary device 101. When the consignment period complies with the policy of the RI 200, the RI 200 accepts the consignment to manage the license during the consignment period. When the license is not downloaded by the second device 102, the RI 200 notifies the primary device 101 of the download failure. After consigning the license information to the RI 200, the primary device 101 notifies the primary device 101 of the consignment state, thereby managing the license efficiently. Also, since the RI 200 stores the license information during the consignment period, it is possible to improve storage utilization of the RI 200. In a case where the consignment period set by the primary device 101 does not comply with the policy of the RI 200, the RI 200 may reset the consignment period and notify the primary device 101 of the reset consignment period.

Figure 2:
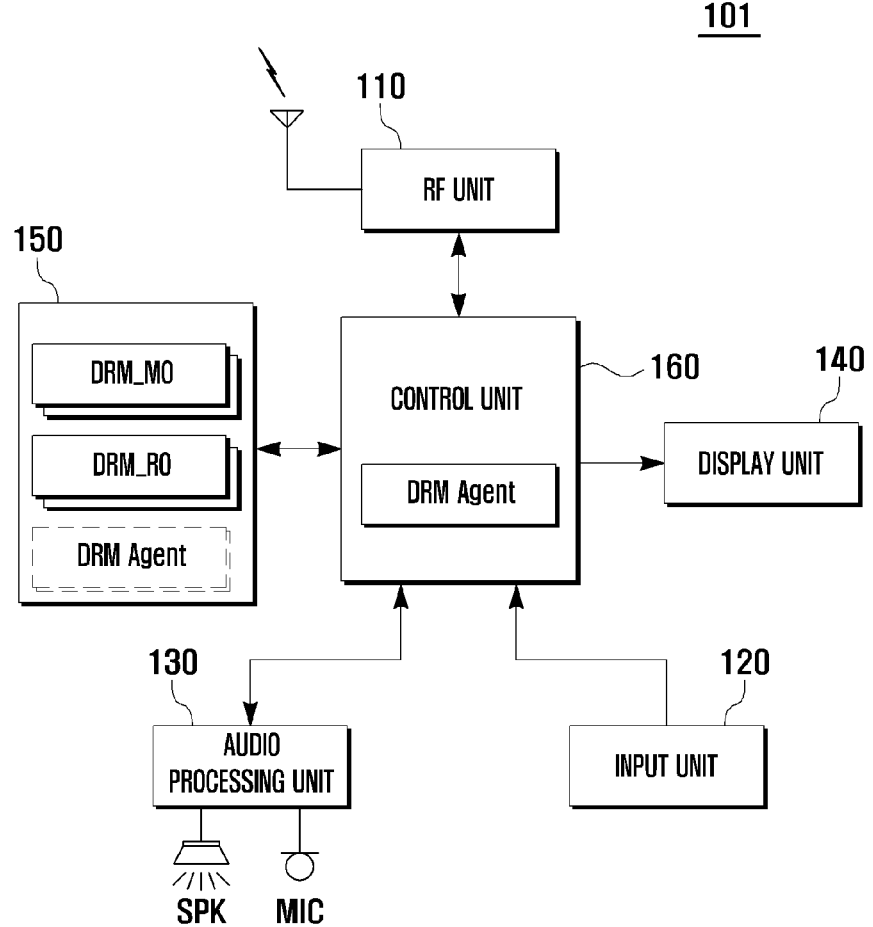
FIG. 2 is a block diagram illustrating a configuration of a primary device according to an exemplary embodiment of the present invention.

FIG. 2 is a block diagram illustrating a configuration of the primary device of FIG. 1.

Referring to FIG. 2, the primary device 101 includes a Radio Frequency (RF) unit 110, an input unit 120, an audio processing unit 130, a display unit 140, a memory unit 150 and a control unit 160.

The RF unit 110 is responsible for establishing a radio channel for voice and data communication with another device. That is, the RF unit 110 is configured to establish a voice communication channel, a data communication channel and/or a video communication channel with a mobile communication system. The RF unit 110 includes an RF transmitter for up-converting and amplifying a transmission signal and an RF receiver for low noise amplifying and down-converting a received signal. More particularly, the RF unit 110 may establish data communication channels with the content server 201 and the RI 200. By means of the RF unit 110, the primary device 101 may download a DRM content (DRM_MO) from the content server 201 and a license (DRM_RO) required for consuming the DRM_MO from the RI 200. The RF unit 101 also transmits the license information corresponding to the DRM_RO stored in the memory unit 150 to the RI 200 and receives a license download trigger message or a consignment withdrawal trigger message (e.g., RO Acquisition trigger) transmitted by the RI under the control of the control unit 160. The RF unit 110 also may download the DRM_MO from the RI 200 under the control of the control unit 160.

The input unit 120 is provided with a plurality of alphanumeric keys for inputting alphanumeric data and function keys for configuring and executing various functions of the primary device 101. The function keys may be implemented in the form of a set of navigation keys, side keys and shortcut keys. The input unit 120 generates key signals corresponding to the keys input by the user and outputs the key signals to the control unit 160. More particularly, the input unit 120 is configured to generate key signals for activating menus associated with consigning a DRM_RO to the RI 200, retrieving the DRM_RO from the memory unit 150, creating license information on the retrieved DRM_RO and transmitting the license information to the RI 200. As described above, the license consignment service may be provided as an option, such that the license consignment menu item is added to the main menu screen of the device. In association with the license consignment, the input unit 120 is configured for the user to set a consignment period and a notification count.

The audio processing unit 130 processes the audio signal input by the control unit 160 to be output through a Speaker (SPK) in the form of audible sound wave and processes the sound wave input by a Microphone (MIC) to be output to the control unit 160 in the form of an audio signal. More particularly, the audio processing unit 130 processes an audio signal included in the DRM_MO The display unit 140 displays various function menus of the device, user input information and operation status of the device. That is, the display unit 140 displays various application screens such as an idle mode screen, a menu screen, a message composition screen and a call progressive screen. More particularly, the display unit 140 is configured to display a DRM_RO consignment menu screen, a DRM_RO list presentation screen, a DRM_RO consignment setting screen and a DRM_RO consignment progressive screen. When a license download trigger message is received from the RI 200, the display unit 140 displays an alarm message indicating a receipt of the license download trigger message. The display unit 140 may be implemented with a Liquid Crystal Display (LCD) supporting touchscreen functionality. In this case, the display unit 140 may operate as part of the input unit 120.

The memory unit 150 stores application programs required for executing functions of the device 101 and DRM_MOs and DRM_ROs. The memory unit 150 also temporarily stores the license information created to be transmitted by the RI 200 and provides a buffer for buffering the data transmitted by the RI 200. The memory unit 150 may be divided into a program region and a data region.

The program region stores an Operating System (OS) of the device 101 and application programs, such as a camera application, audio playback application, still and motion picture playback application and the like. More particularly, the program region stores the applications associated with the playback of the DRM_MOs and DRM agent application (DRM_Agent) for transmitting license information to the RI 200 and downloading DRM_ROs from the RI 200. When a specific function is requested by the user, the applications associated with the requested function are activated under control of the control unit 160.

The data region stores the data generated while the primary device 101 operates, and the data comprises still images and motion images captured using a camera function, phonebook data, audio data and information associated with the data. More particularly, the data region stores the DRM_MOs and the DRM_ROs. The data region also stores the information associated with the use of the DRM_ROs. When the DRM_RO is used for consuming the corresponding DRM_MO, the device 101 may generate the license information containing the license usage information. For example, when a DRM_RO permits ten (10) times of playback of the corresponding DRM_MO and the DRM_MO is played twice, the license information contains the play count set to eight (8) that defines how many times the DRM_MO may be played using the DRM_RO.

The control unit 160 controls signaling among internal components and an operation of each component. More particularly, the control unit 160 controls such that, when the DRM consignment is requested by the user, the display unit 140 displays screens presenting the progress of the DRM_RO consignment process. The control unit 160 activates the DRM_Agent to generate the license information set with a consignment period and notification count of the DRM_RO. Once the DRM_Agent is activated, the control unit 160 transmits the license information corresponding to the DRM_RO to the RI 200 by means of the DRM_Agent. The process for setting the consignment period and notification count may be skipped. In this case, the consignment period and notification count may be determined according to the policy of the RI 200. In order for the device 101 to consign the DRM_RO to the RI 200, the device 101 may use "RO Upload" or "RO Move" protocol specified in the OMA DRM standard. The "RO Upload" protocol is used for the device that consigned the license information or member devices of a domain to download the DRM_RO corresponding to the license information. The "RO Move" protocol is used for the device that consigned the license information to transmit the DRM_RO to another device.

When the license consignment service is provided with the RO Upload protocol, the license consignment is requested using a Rights Object Acquisition Protocol (ROAP)-RO UploadRequest message of which Extensions field ROAP-RO UploadRequest message is set to a value indicating properties of "Expiretime" indicating a period of the DRM_RO consignment as illustrated in Table 1. FIG. 3 illustrates an XML representation of the ROAP-RO UploadRequest message.

TABLE 1

| ROAP-RO UploadRequest | |
| --- | --- |
| Parameter | Mandatory/Optional |
| Device ID | M |
| RI ID | M |
| Device Nonce | M |
| Request Time | M |
| Uploaded ROs | O |
| Certificate Chain | O |
| Extensions | O |
| Signature | M |

Referring to Table 1 and FIG. 3, the control unit 160 sets the "Extensions" field to a value that optionally indicates "Expiretime" corresponding to the consignment period or to "Number of Notify" corresponding to the notification count and transmits the ROAP-RO UploadRequest message to request the RI 200 for the license consignment service. Once the ROAP-RO UploadRequest message is received, the RI 200 verifies the value of the Extensions field and informs the ROAP-RO UploadRequest message of which Extensions field is set, for at least one of the Expiretime and Number of Notify, as the RO-Upload message for requesting license consignment. If the ROAP-RO UploadRequest message is the consignment request RO-Upload message, the RI 200 performs a license consignment process. That is, the RI 200 preserves the license and performs tasks associated with the consignment until the time indicated by the Expiretime expires. When the Extensions field is set without the "Expiretime" and "Number of Notify" properties, the RI 200 may set the consignment condition.

When the license consignment service is provided with the RO Move protocol, the license consignment is requested using an ROAP-MoveRightsRequest message by setting the Extensions field of the ROAP-MoveRightsRequest message to a value indicating properties of "Expiretime" and "Number of Notify" as illustrated in Table 2.

TABLE 2

| ROAP-MoveRightsRequest | | |
| --- | --- | --- |
| element/attribute | usage | Value |
| reqID | M | Default, as specified in [SCE-GEN], section xyz |
| resID | M | Default, as specified in [SCE-GEN], section xyz |
| nonce | M | Default, as specified in [SCE-GEN], section xyz |
| Time | M | Default, as specified in [SCE-GEN], section xyz |
| certificateChain | O | Default, as specified in [SCE-GEN], section xyz |
| reqInfo | M | Specified below |
| Extensions | O | Specified below |
| signature | M | Specified below |

The control unit 160 sets the "Extensions" field of the ROAP-MoveRightsRequest" message, specified in OMA DRM standard, to a value indicating the "Expiretime" that defines the consignment expiration with a type of time, such as "datetime." The control unit 160 also may set the "reqInfo field" of the ROAP-MoveRightsRequest message to a value indicating a consignment condition, such as the consignment expiration and alarm. In this case, the control unit 160 may define the structure of the reqInfo field in the Extensions field and set the Expiretime with an element, such as "Peer Key Identifier."

The control unit 160 may generate an XML representation of the Expiretime as follows:

```
<<copmlexType name="Expiretime>
<complexContent>
<extension base="roap:Extension">
<sequence>
<element name="expiretime" type="datetime" maxOccurs="1"/>
<element name="NumberOfNotify" type="string" maxOccurs="1"/>
<sequence>
</extension>
</complexContent>
</complexType>
```

The value of the Expiretime field may not be set by the user. In this case, the RI 200 may set the Expiretime or the datetime value. The control unit 160 may also set the Extensions field with a value of the Number of Notify indicating the notification time and cycle. Also, the user may set at least one of the "Expiretime" and the "Number of Notify" parameters.

In this manner, the license information corresponding to the DRM RO stored in the memory unit 150 may be consigned with the consignment condition set by the user and the RI 200 notifies the primary device 101 to download the license before the consignment period expires. As a result, the primary device 101 that received the download trigger message may download DRM_RO or withdraw the consignment from the RI 200. In the meantime, since the secondary device 102 may be structured substantially the same as the primary device 101 and operate in the same manner as the primary device 101, detailed description of the structure and operation of the secondary device 102 is omitted.

Figure 4:
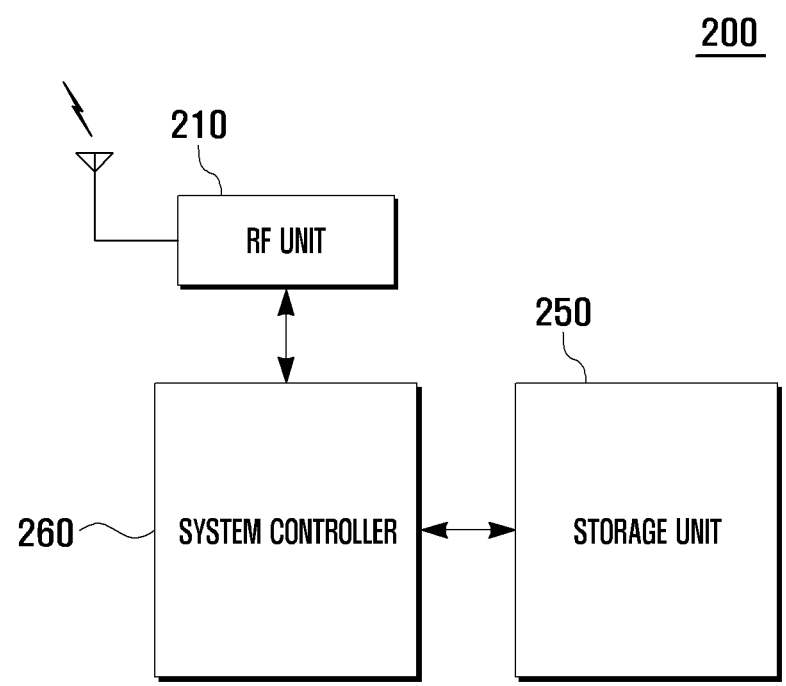
FIG. 4 is a schematic block diagram illustrating a configuration of a Rights Issuer (RI) according to an exemplary embodiment of the present invention.

FIG. 4 is a schematic block diagram illustrating a configuration of an RI 200 according to an exemplary embodiment of the present invention.

Referring to FIG. 4, the RI 200 includes an RF unit 210, a storage unit 250 and a system controller 260.

The RF unit 210 is responsible for establishing a communication channel with the primary device 101. The RF unit 210 may include a communication module supporting access to a cellular network or an Internet Protocol (IP) network depending on the radio interface used by the device 101. The RI 200 may transmit the license to the primary device 101 and/or the secondary device 102 and receive the license information transmitted by the primary device 101 by means of the RF unit 210.

The storage unit 250 stores the licenses managed by the RI 200 and the license information consigned by the primary device 101. The license information includes the consignment conditions of the DRM_RO corresponding to the license information such as the consignment period, notification time, license DRM_RO ID, server ID and device ID.

The system controller 260 includes a timer for determining the remaining consignment period of the license information and determining the consignment expiration time of the DRM_RO. That is, the system controller 260 starts the timer at the time when the license information is consigned and determines whether the accumulated time reaches the expiration time set by the primary device 101 or according to the RI's policy. When the accumulated time has reached the expiration time, the RI 200 notifies the primary device 101 of the consignment expiration. When the consignment conditions are set by the user to notify the secondary device 102 of the consignment expiration, the RI 200 notifies the secondary device 102 of the consignment expiration according to the consignment conditions. For instance, when the notification time is set to ten (10) by the user at the primary device 101, the RI 200 transmits the primary device 101 or the secondary device 101 a license download trigger message ten (10) times before the consignment expiration.

The notification condition may be set according to the RI's policy. When the RO request message is transmitted with a notification flag without consignment period information, the license download trigger message is transmitted in an interval determined according to the policy of the RI 200.

When the primary device 101 requests to move a license to the secondary device 102, the system controller 260 determines the consignment condition and notifies the secondary device 102 of the move request based on the consignment condition. For instance, the system controller 260 transmits the secondary device 102 a license download trigger message a predetermined number of times and until receiving a response message before the consignment expiration time. If no response message is received, the system controller 260 notifies the primary device 101 of a download failure message such that the primary device 101 withdraws the consignment.

In a case where the consignment condition set by the primary device 101 does not comply with the RI's consignment policy in the license consignment process, the system controller 260 notifies the primary device 101 that the consignment condition is invalid. In more detail, when at least one of the "Expiretime" and "Number of Notify" values of the Extensions field of the RO UploadRequest message or the RO MoveRightsRequest message is out of the ranges defined in the RI's policy, the system controller 260 resets the invalid value within the range defined in the RI's policy and transmits to the primary device 101 an RO response with the reset value. With reference to the value of the Extensions field in the RO response message, the primary device 101 may determine whether the license consignment is normally accepted by the RI 200. When the value of the Extension field is modified, the primary device 101 may output a popup message indicating the modification of the consignment condition. The popup message may inform of a consignment condition reset by the RI 200.

Table 3 illustrates parameters of the ROAP-RO Upload-Response message, i.e., ROAP-RO UploadResponse message, transmitted by the RI 200 in response to the RO Upload request message, i.e., ROAP-RO UploadRequest message. FIG. 5 illustrates an XML representation of the ROAP-RO UploadResponse message.

TABLE 3

ROAP-RO UploadResponse

| Parameter | Mandatory/Optional |
|---|---|
| Status | M |
| Device ID | M |
| RI ID | M |
| Device Nonce | M |
| Certificate Chain | O |
| OCSP Response | O |
| Extensions | O |
| Signature | M |

Referring to Table 3 and FIG. 5, the Extensions field of the ROAP-RO UploadResponse message may be set with or without <element name="Expiretime" type="dateTime" maxOccurs="1"/> or <element name="NumberOfNotify" type="String" maxOccurs="1"> for indicating whether the RI 200 supports the license consignment service. Accordingly, although the Extensions filed of the ROAP-RO UploadRequest message transmitted by the primary device 101 is set with at least one of the "Expiretime" and "Number of Notify" features, the RI 200, which does not support the license consignment service, replays with the ROAP-RO UploadResponse message of which the "Extensions" field is empty. In the case where at least one of the "Expiretime" and "Number of Notify" values is out of the RI's policy, the RI 200 transmits the primary device 101 the ROAP-RO UploadResponse message of which "Expiretime" and "Number of Notify" values are reset within the range supported by the RI's policy range. The parameters listed in the Table 3 may follow the definitions specified in the OMA DRM standard.

Table 4 illustrates the parameters of the RO Move response message, i.e., ROAP-MoveRightsResponse message, transmitted by the RI 200 in response to the RO Upload request message, i.e., the ROAP-MoveRightsRequest message.

TABLE 4

ROAP-MoveRightsResponse

| element/attribute | usage | Value |
| --- | --- | --- |
| Status | M | Default, as specified in [GEN], section xyz |
| errorMessage | O | Default, as specified in [GEN], section xyz |
| errorRedrictURL | O | Default, as specified in [GEN], section xyz |
| reqID | M | Default, as specified in [GEN], section xyz |
| resID | M | Default, as specified in [GEN], section xyz |
| Nonce | M | Default, as specified in [GEN], section xyz |
| Certificate Chain | O | Default, as specified in [GEN], section xyz |
| ocsp Response | O | Default, as specified in [GEN], section xyz |
| rspInfo | M | Specified below |
| Extensions | O | Specified below |

Referring to Table 4, the ROAP-MoveRightsResonse message includes the Extensions filed as the ROAP_RO UploadResponse message in order to indicate whether the RI 200 supports the license consignment service. For this purpose, the Extensions field of the ROAP-MoveRightsResponse message may be redefined or the "extensions" parameter defined in the "rspInfo" field of the ROAP message specified in the OMA DRM may be used.

When an RO Upload message or RO Move message is received from the primary device 101, the RI 200 verifies a specific field, e.g. "extensions" field. The RI 200 then determines whether the "extensions" field is set with at least one of the "Expiretime" and "Number of Notify" value and stores the license information based on the consignment condition proposed by the primary device 101 or reset according to the RI's policy. The RI 200 may transmit to the secondary device 102 a license download trigger message before the license consignment expiration. Once the consignment has expired, the RI 200 notifies the primary device 100 of the expiration of the license consignment.

The download trigger message, i.e., the license download trigger message, may be transmitted a certain number of times before the consignment expiration, at a certain interval in the consignment period, or at an increasing transmission frequency as the consignment expiration gets closer.

A license consignment method according to an exemplary embodiment of the present invention is described hereinafter in association with the above-described license consignment system.

Figure 6:
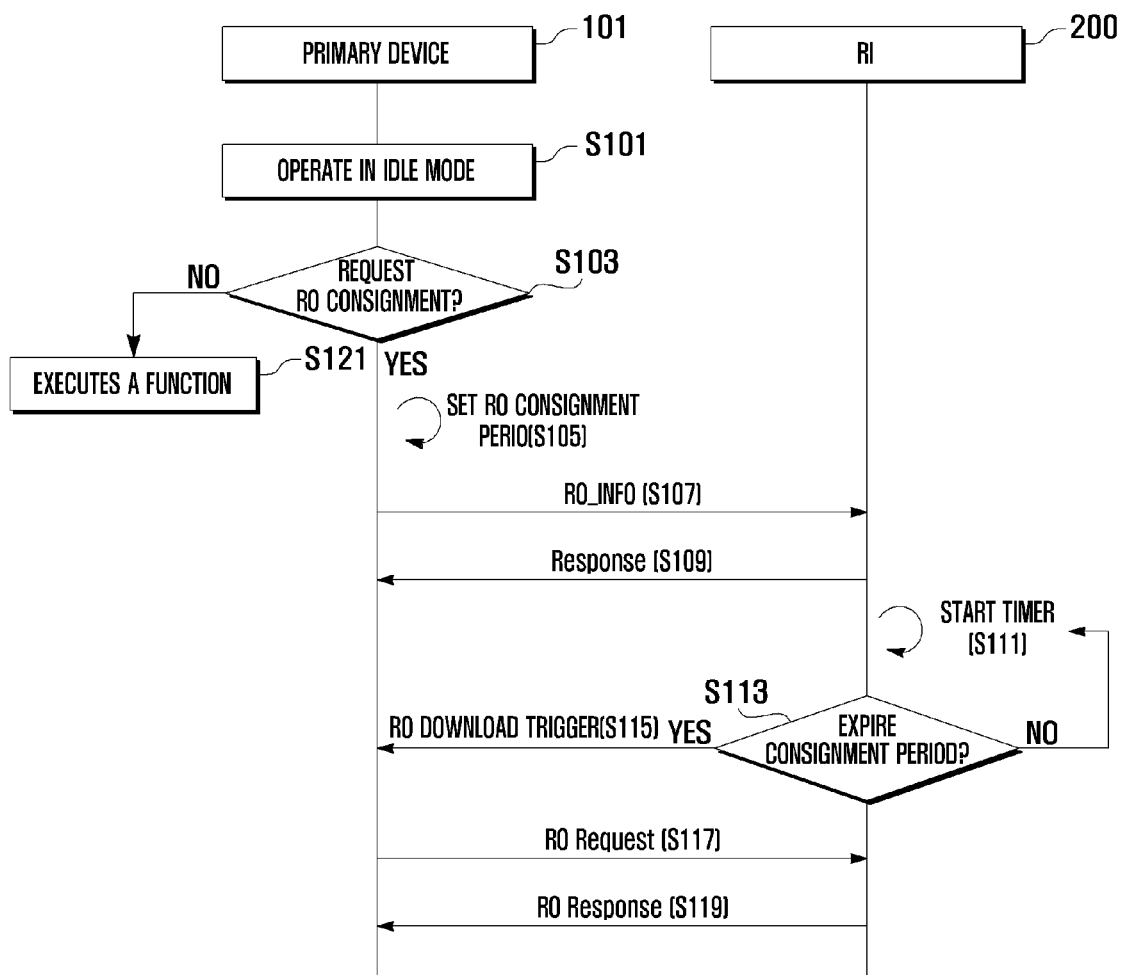
FIG. 6 is a flowchart illustrating a license consignment method according to an exemplary embodiment of the present invention.

FIG. 6 is a flowchart illustrating a license consignment method according to an exemplary embodiment of the present invention.

Referring to FIG. 6, the control unit 160 of the primary device 101 detects an operation in an idle mode and displays an idle mode screen in step S101. While the primary device 101 operates in the idle mode, the control unit 160 monitors to detect a command input by the user. If a command is detected, the control unit 160 determines whether the command is an RO consignment request command in step S103. If a command is not an RO consignment request command, then the control unit 160 executes a function instructed by the command in step S121. The command may be of making a call, playing a file or a broadcast stream and activating a camera function.

Otherwise, if the command is an RO consignment request command, the primary device 101 sets RO consignment conditions including an RO consignment period and notification option in step S105. In the consignment condition setting process, the user of the primary device 101 sets the consignment period and the notification option which indicates how the RI 200 transmits a license download trigger message to the secondary device 102 (or primary device 101). The notification option may indicate a frequency, a cycle, and/or a time point for transmitting the license download trigger message (e.g., RO Acquisition Trigger message). For instance, when the notification option is set to indicate ten (10) transmission times in an average interval starting at a specific time point, the RI 200 transmits the license download trigger message (RO Acquisition Trigger message) to the secondary device 102 (or primary device 101) according to the notification condition. The consignment setting process may be skipped. In this case, the consignment period is set according to the policy of the RI 200.

After the consignment condition setting process has completed or been skipped, the primary device 101 transmits license information (RO_Info) to the RI 200 in step S107. The license information (RO_Info) includes the consignment conditions including at least one of a consignment period, a notification option, a device ID, a domain ID, a license ID, a Server ID and a content ID.

Upon receipt of the RO_Info, the RI 200 transmits a response message to the primary device 101 in step S109. The response message includes an Extensions field which is not set when the RI 200 does not support the license consignment service. If the response message received from the RI 200 has an empty Extensions field, the primary device 101 recognizes that the RI 200 does not support the license consignment service and outputs a popup message to inform the user of consignment failure. In the meantime, when the consignment condition set by the primary device 101 does not comply with the policy of the RI 200, i.e. when the consignment expiration time is later than the expiration time of the license or when the consignment period is out of the available license period range, the RI 200 may modify the consignment conditions in the range of the license period and may transmit the response message having the Extensions field set with the modified conditions to the primary device 101. In this case, the primary device 101 outputs a message to inform the user of the modified consignment conditions. When the RO_Info received from the primary device 101 has no consignment condition, the RI 200 transmits the primary device 101 the response message of which the Extensions field is set with a default consignment condition according to the policy of the RI 200. In a case where the consignment conditions are set or corrected, the RI 200 transmits the primary device 101 the response message including the information regarding the setting or correction on the consignment conditions in step S109.

Meanwhile, if the RO_Info received from the primary device 101 is set with the consignment period, the RI 200 starts a timer in step S111 and monitors the timer to determine whether an accumulated time of the timer reaches the consignment expiration time in step S113. Although the RI 200 determines the expiration of the consignment by comparing accumulated time with the consignment period set within the RO_Info, a new consignment expiration time may be set by the RI 200. The new consignment expiration time may be set before or after the expiration time or at the original consignment expiration time. Accordingly, the RI 200 may determine the notification time at the consignment expiration time or a time point before or after a certain time relative to the consignment expiration time. In an exemplary implementation, it is assumed that the notification time is the consignment expiration time. The RI 200 monitors the timer until the accumulated time of the timer reaches the consignment expiration time. If the accumulated time of the timer reaches the consignment expiration time, then the RI transmits the primary device 101 the RO download trigger message, i.e., RO Acquisition trigger message in step S115. That is, when the consignment period expires, the RI 200 transmits the primary device 101 the RO download trigger message such that the primary device 101 withdraws the RO consignment.

Upon receipt of the RO download trigger message, the primary device 101 transmits the RI 200 an RO Request message for requesting withdrawal of the license consignment in step S117. In response to the RO Request message, the RI 200 transmits the primary device 101 an RO Response message. Consequently, the RO consignment is withdrawn in step S119.

As described above, the license consignment method according to an exemplary embodiment allows the RI 200 to preserve the RO consigned by a device and notify the device of the consignment expiration. When the consignment period is not set by the device. The license consignment method enables the RI 200 to provide the license consignment service adaptive to the situation in which the license consignment is requested without consignment condition or the consignment condition set by the device does not comply with the policy of the RI.

Since the RI 200 periodically notifies the device of the consignment expiration of a license consigned by the device, the device may download the consigned license or withdraw the consignment at an appropriate time. The RI 200 may improve the memory utilization efficiency with consignment periods set for the preserved licenses.

Figure 7:
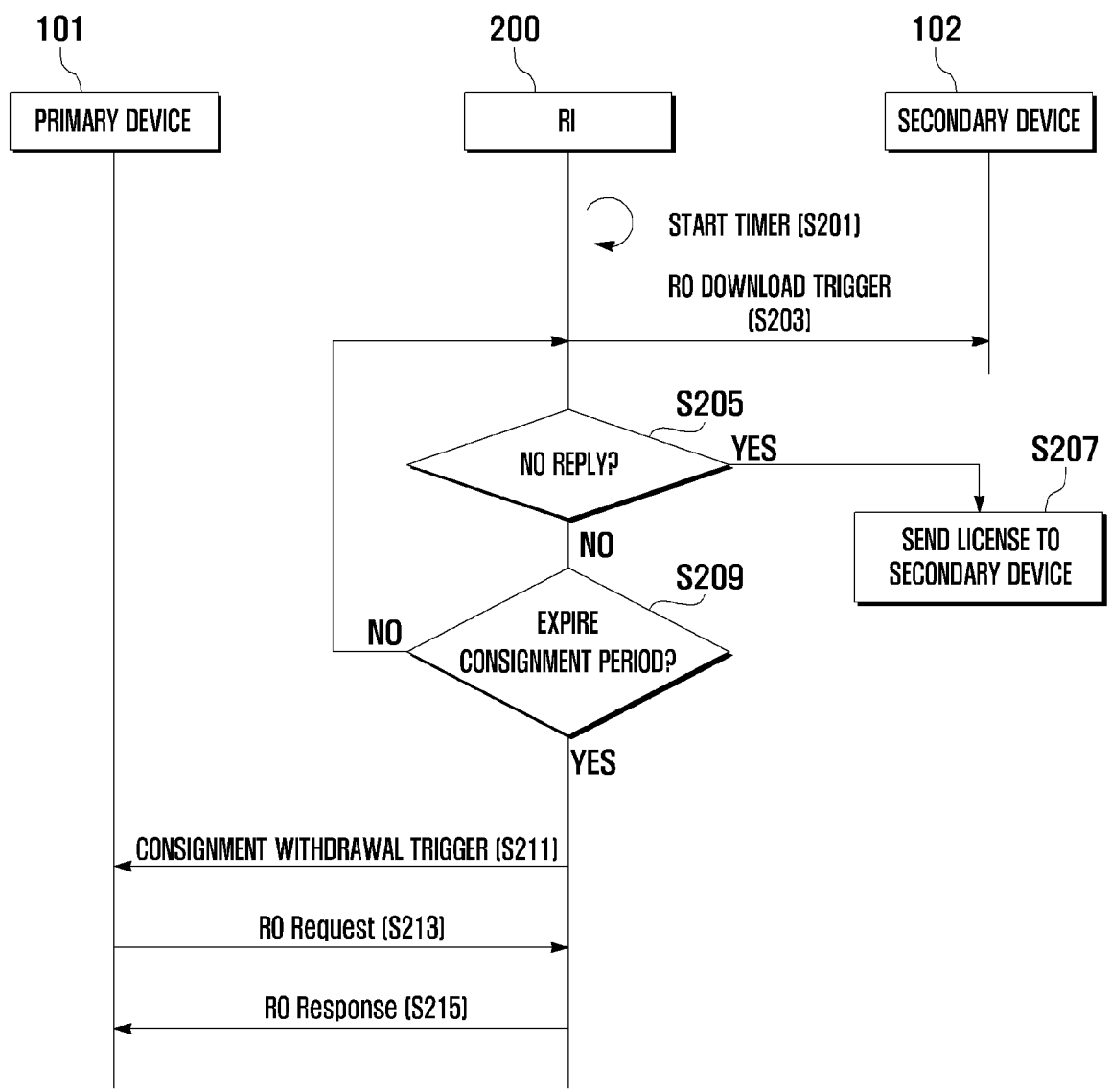
FIG. 7 is a flowchart illustrating a license consignment method according to an exemplary embodiment of the present invention.

FIG. 7 is a flowchart illustrating a license consignment method according to an exemplary embodiment of the present invention. In the exemplary embodiment, it is assumed that a license has been consigned to the RI 200 by the primary device 101 and the consignment conditions have been set by the primary device 101 or determined by the RI 200.

Referring to FIG. 7, upon receipt of the license consignment request message transmitted by the primary device 101, the RI 200 starts a timer in step S201 and transmits a license download trigger message (e.g., RO Acquisition Trigger message) to the secondary device 102 according to the consignment condition indicated in the license consignment request or the policy of the RI 200 in step S203. Here, the RI 200 may transmit the license download trigger message periodically at a predetermined interval. The interval may be shortened as the accumulated time of the timer is close to a consignment expiration time. The license download trigger message transmission is repeated right before the consignment period expires.

After sending the license download trigger message, the RI 200 determines whether a license download request message is received from the secondary device 102 in step S205. If a license download request message is received, then the RI 200 transmits a license consigned by the primary device 101 to the secondary device 102 in step S207.

Otherwise, if a license download request message is not received, then the RI 200 determines whether the accumulated time of the timer reaches the consignment expiration time in step S209. If the accumulated time does not reach the consignment expiration time, the RI 200 repeats steps S203 and S209. Here, the consignment expiration time may be the time reset by the RI 200 as described with reference to the FIG. 4.

Otherwise, if the accumulated time reaches the consignment expiration time, i.e., when the consignment period has expired, the RI 200 identifies the primary device 101 and transmits the primary device 101 a consignment withdrawal trigger message, i.e., the RO Acquisition Trigger message in step S211.

In more detail, if the RI 200 transmits the secondary device 102 the license download trigger message and does not receive a license download request message in response to the license download trigger message before the license consignment expiration, the RI 200 determines that the secondary device 102 is in a state in which it is not possible to download the license. In this case, the RI 200 transmits the primary device 101 the consignment withdrawal trigger message such that the primary device 101 withdraws the consignment of the license. That is, the RI 200 transmits the RO Acquisition Trigger message to the primary device 101 and the primary device 101 transmits the RO Request message to the RI 200 in response to the RO Acquisition Trigger message in step S213. Finally, the RI 200 transmits an RO Response message to the primary device 101 in step S215, whereby the license consigned to the RI 200 is withdrawn.

Figure 8:
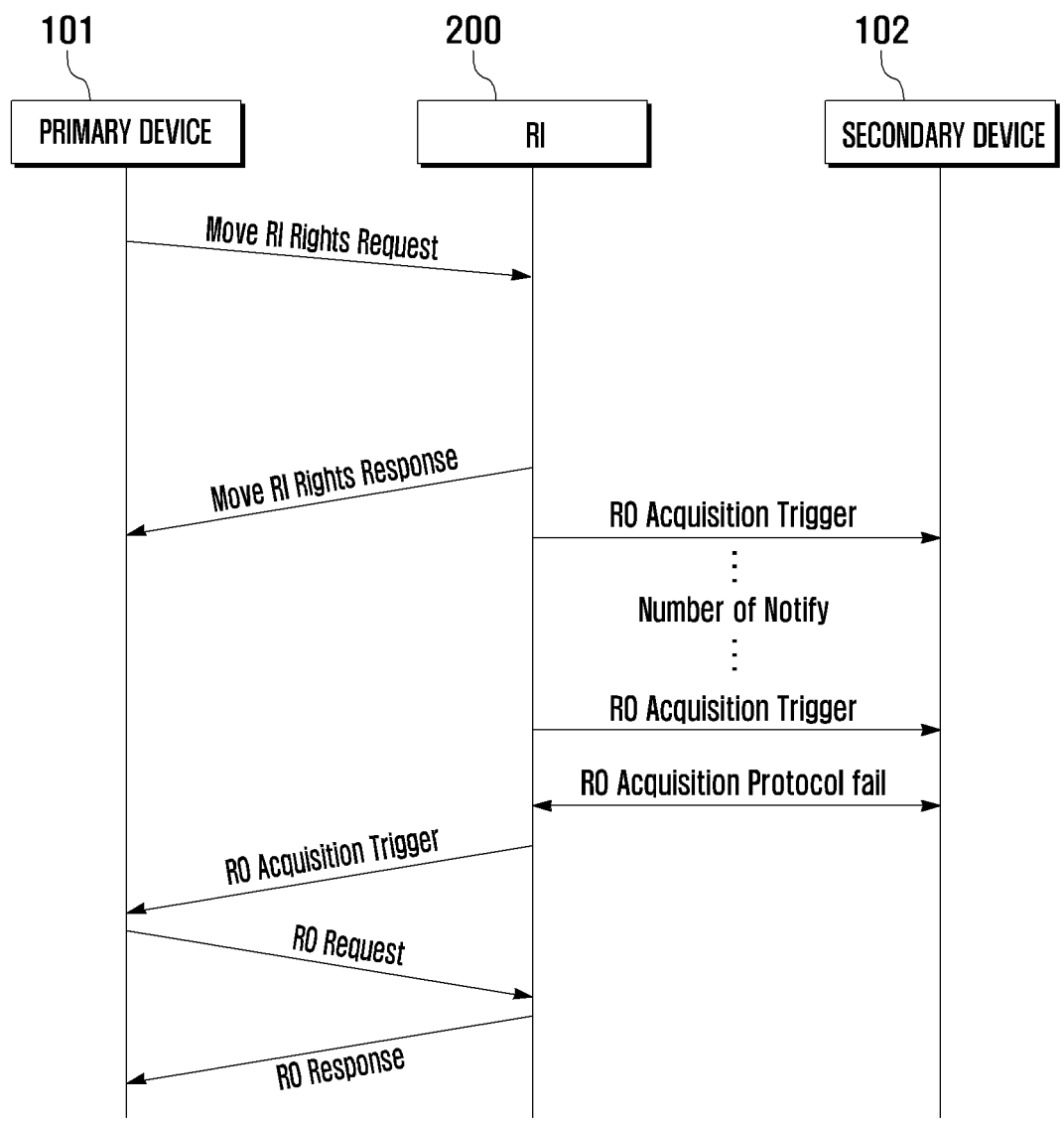
FIG. 8 is a message flow diagram illustrating message flows of a license consignment method according to an exemplary embodiment of the present invention.

FIG. 8 is a message flow diagram illustrating message flows in the license consignment method according to an exemplary embodiment of the present invention.

Referring to FIG. 8, the primary device 101 first transmits the RI 200 a MoveRIRightsRequest message for moving a license to the secondary device 102. At this time, the primary device 101 may set the Extensions field of the MoveRIRightsRequest message with at least one of "Expiretime" and "Number of Notify" parameters. These parameters are defined within the message in a format of <element name="Expiretime" type="dateTime" maxOccurs="1"/> and <element name="NumberOfNotify" type="String" maxOccurs="1"/>, respectively.

Upon receipt of the MoveRIRightsRequest message, the RI 200 transmits a MoveRIRightsResponse message to the primary device 101. Here, the MoveRIRightsResponse message includes the Extensions field including information associated with the consignment conditions. If the RI 200 supports the consignment conditions proposed in the MoveRIRightsRequest message, then the RI 200 sets the Extensions field of the MoveRIRightsResponse message to be identical with that of the MoveRIRightsRequest. Otherwise, if the RI 200 does not support the consignment conditions proposed in the MoveRIRightsRequest message, then the RI 200 sets the Extensions field or the MoveRIRightsResponse message to a value indicating new consignment conditions that comply with the policy of the RI 200. For instance, the RI 200 may set the time value type in the consignment period condition to "datetime." When the primary device 101 does not set the value of the Extensions field, the RI 200 adds a value of the Extensions field to the MoveRIRightsResponse message according to its policy.

After transmitting the MoveRIRightsResponse to the primary device 101, the RI 200 transmits an RO Acquisition Trigger message to the secondary device 102 a certain number of times indicated by the "Number of Notify" parameter. If a response message is not received after transmitting RO Acquisition Trigger message the certain number of times, the RI 200 determines the failure of the RO Acquisition protocol and transmits an RO Acquisition Trigger message to the primary device 101. The value indicated by the "Number of Notify" parameter is determined such that the RO Acquisition Trigger message is transmitted to the secondary device 102 before expiration of the consignment period. The last transmission time of the RO Acquisition Trigger message is identical to or similar to the consignment expiration time.

Upon receipt of the RO Acquisition Trigger message, the primary device 101 transmits to the RI 200 an RO Request message based on the license information contained in the RO Acquisition Trigger message. Consequently, the RI 200 transmits an RO Response message to the primary device 101, resulting in withdrawal of the license consignment.

As described above, the license consignment method and system of the present invention enables an RI to preserve a license consigned by a device and request a designated device to download the consigned license before expiration of the consignment period. When the consignment period expires without downloading of the license, the RI 200 requests the device that consigned the license to withdraw the consignment according to the consignment conditions set by the device or the RI, thereby preventing the consigned license from being accidently removed.

Although the license consignment method and system is described in a case where an entire license associated with a DRM content stored in a device is consigned to the RI 200, the license may be partially consigned. For example, the device may partition a license having a 30-day consuming right into two 15-day consuming rights and consign one of the 15-day consuming rights to the RI 200. The license consignment may be adopted to the license defining a consuming count in the same manner. For instance, the device may consign ten (10) times or twenty (20) times consuming right of a license that permits consuming of a DRM content to the RI 200 a total of 30 times.

Meanwhile, the device may store the license, of which consignment is withdrawn from the RI appropriately, using a DRM agent.

Although the license consignment method and system is described in an exemplary case where the RI transmits the license download trigger message to a primary device consigned with the license or a secondary device designated by the primary device, the RI may transmit the license download trigger message to both the primary device and the secondary device simultaneously. A method for transmitting the license download trigger message may be determined by a preset policy of the RI.

As described above, the license consignment system and method of the present invention provides a portable device with an efficient license consignment procedure by means of a license server, thereby improving license utilization reliability.

While the invention has been shown and describe with reference to certain exemplary embodiments thereof, it will be understood by those skilled in the art that various changes in form and details may be made therein without departing from the spirit and scope of the invention as defined by the appended claims and their equivalents.

What is claimed is:

1. A license consignment service method for a portable device, the method comprising:
   selecting, by the portable device, a license, from among at least one license stored on the portable device;
   designating, by the portable device, a device that will consume protected content corresponding to the selected license stored on the portable device;
   transmitting, by the portable device, license information corresponding to the selected license to a license server, wherein the license information includes a consignment period of the selected license and notification information;
   determining, by the license server, an established consignment period of the selected license and established notification information based on the transmitted license information corresponding to the selected license;
   generating, by the license server, a download trigger;
   including, by the license server, within the generated trigger, information that solicits the designated device to download the license before the established consignment period ends;
   associating, by the license server, the generated download trigger to the designated devices based on the established notification information;
   transmitting, by the license server, the generated download trigger to the designated device;
   determining, by the license server, that the selected license is not downloaded before the established consignment period ends;
   based on the determination that the selected license has not been downloaded before the established consignment period ends, transmitting a Rights Object (RO) acquisition trigger message from the license server to the portable device; and
   transmitting, by the portable device, a RO response message to the license server, the RO response message indicating that the license consigned to the license server is withdrawn from the license server.

2. The license consignment service method of claim 1, further comprising:
   determining at least one of that the license information comprises no consignment conditions and that the consignment conditions do not comply with a consignment policy of the license server; and
   determining new consignment conditions based upon the determining the at least one of that the license information comprises no consignment conditions and that the consignment conditions do not comply with the consignment policy of the license server.

3. The license consignment service method of claim 2, further comprising transmitting a consignment condition notification message indicating the new consignment conditions from the license server to the portable device.

4. The license consignment service method of claim 3, further comprising outputting, at the portable device, a notification message informing of new consignment conditions.

5. The license consignment service method of claim 1, further comprising:
   determining that the license server does not support a license consignment service; and
   transmitting, based on the determining that the license server does not support the license consignment service, a consignment rejection message from the license server to the portable device for informing the portable device that the license server does not support the license consignment service.

6. A license consignment system comprising:
   a portable device including a portable device processor and a non-transitory medium storing instructions that, when executed by the portable device processor, cause the portable device to perform the steps of:

storing at least one license, in a memory unit of the portable terminal, that permits consumption of protected contents;

selecting a license, from among the at least one license stored on the portable device;

designating a device that will consume protected content corresponding to the selected license stored on the portable device;

transmitting license information corresponding to the selected license to a license server, the license information including a consignment period and notification information;

the license server including a license server processor and another non-transitory medium storing instructions that, when executed by the license server processor, cause the license server to perform the steps of:

storing the license information transmitted by the portable device;

determining an established consignment period of the selected license and established notification information based on the transmitted license information corresponding to the selected license;

generating a download trigger message;

including, within the generated trigger message, information that solicits the designated device to download the selected license before the established consignment period expires;

associating the generated download trigger to the designated devices based on the established notification information;

transmitting the generated download trigger to the designated device;

determining that the selected license is not downloaded before the established consignment period ends;

based on the determination that the selected license has not been downloaded before the established consignment period ends, transmitting a Rights Object (RO) acquisition trigger message to the portable device; and receiving a RO response message transmitted by the portable device, the RO message indicating that the license consigned to the license server is withdrawn from the license server.

7. The license consignment system of claim 6, wherein the designated device may comprise at least one of the portable device that consigned the selected license to the license server and another portable device.

8. The license consignment system of claim 7, wherein the license server including the second controller executes further program instructions for causing the license server to:
transmit the download trigger message a certain number of times at a certain interval while determining whether a response message is received from the designated device.

9. The license consignment system of claim 6, wherein the license information comprises consignment conditions comprising at least one of the consignment period and the notification policy.

10. The license consignment system of claim 9, further comprising:

determining at least on of that the license information comprises no consignment conditions and that the consignment conditions do not comply with a consignment policy of the license server; and based on the determination that at least one of the license information comprises no consignment conditions and the consignment conditions do not comply with a consignment policy of the license server, causing the license server to determine new consignment conditions.

11. The license consignment system of claim 10, wherein the license server including the second controller executes further program instructions for causing the license server to transmit a consignment condition notification message indicating the new consignment conditions to the portable device.

12. The license consignment system of claim 11, wherein the portable device including the first controller executes further program instructions for causing the portable device to output a notification message informing of the new consignment conditions.

13. The license consignment system of claim 6, wherein the license server including the second controller executes further program instructions for causing the license server to:
determine that the license consignment service is not supported; and
based upon the determination that the license consignment service is not supported, transmit a consignment rejection message to the portable device for informing the portable device that the license server does not support the license consignment.

14. A license consignment service method for a portable device, the method comprising:

selecting, by the portable device, a license, from among at least one license stored on the portable device;

designating, by the portable device, a device that will consume protected content corresponding to the selected license stored on the portable device;

transmitting, by the portable device, license information corresponding to the selected license to a license server, wherein the license information includes a consignment period of the selected license and notification information;

determining that the selected license has not been downloaded before an established consignment period ends;

based on a determination that the selected license has not been downloaded before an established consignment period ends, receiving a Rights Object (RO) acquisition trigger message from the license server, wherein the established consignment period being determined by the license server based on the license information corresponding to the selected license;

determining, by the portable device, that the license consigned to the license server is withdrawn from the license server;

transmitting, by the portable device, a RO response message to the license server; and indicating, by the transmitted RO response message, that the license consigned to the license server is withdrawn from the license server.

* * * * *